United States Patent [19]

Davis et al.

[11] Patent Number: 4,972,342

[45] Date of Patent: Nov. 20, 1990

[54] PROGRAMMABLE PRIORITY BRANCH CIRCUIT

[75] Inventors: Gordon T. Davis; Baiju D. Mandalia, both of Boca Raton, Fla.

[73] Assignee: International Business Machines Corporation, Armonk, N.Y.

[21] Appl. No.: 254,985

[22] Filed: Oct. 7, 1988

[51] Int. Cl.$^5$ .......................... G06F 9/42; G06F 13/26
[52] U.S. Cl. ................................ 364/200; 364/241.4; 364/242.8
[58] Field of Search ... 364/200 MS File, 900 MS File

[56] References Cited

U.S. PATENT DOCUMENTS

| | | | |
|---|---|---|---|
| 3,925,766 | 12/1975 | Bardotti et al. | 364/200 |
| 3,967,104 | 6/1976 | Brantingham et al. | 364/900 |
| 4,009,470 | 2/1977 | Danilenko et al. | 364/200 |
| 4,034,349 | 7/1977 | Monaco | 364/200 |
| 4,179,737 | 12/1979 | Kim | 364/200 |
| 4,246,644 | 1/1981 | Flynn et al. | 364/900 |
| 4,271,467 | 6/1981 | Holtey | 364/200 |
| 4,315,314 | 2/1982 | Russo | 364/200 |
| 4,573,118 | 2/1986 | Damouny et al. | 364/200 |
| 4,621,342 | 11/1986 | Capizza et al. | 364/900 |
| 4,636,544 | 1/1987 | Hodge | 364/200 |

*Primary Examiner*—David Y. Eng
*Attorney, Agent, or Firm*—Robert Lieber; John C. Smith

[57] ABSTRACT

A special purpose circuit unit, responsive to a special BBD instruction, provides for more efficient execution of program branches required in poll and test type routines used by data processors. This unit can easily be added to almost any contemporary processing system to speed up performance of priority branch operations. It includes: a stack of registers loadable with branch addresses designating locations of branch target instructions, an input register for holding bits representing branch conditions accessible from immediate (programmable) storage, and a programmable priority encoder responsive to the BBD instruction to select an address from the stack in accordance with the position in the input register of a highest priority one of the bits representing an active request for instruction branching. The selected address is used to fetch an instruction representing the start of a program segment for attending to the selected branch condition. Contents of the branch address stack are alterable by program to allow for varying selections of branch routines to fulfill conditions denotable by different sets of bits loadable into the input register. The priority encoder includes a stack of selection control registers which are also loadable by programs, to allow for variability in the priority ordering accorded to the bit positions of the input register. By dynamically loading information into the branch address and priority selection stacks, subject BBD unit can be shared dynamically for resolving sequence branching relative to multiple different classes of conditions or events depending on system requirements. The unit is configurable to execute its priority and branch address selection operations together in a single clock cycle of the system. In pipelined systems, the BBD function can be conveniently accommodated in parallel with other system functions.

9 Claims, 6 Drawing Sheets

FIG. 1

|          |            | Inst. n    | Execute |
|----------|------------|------------|---------|
|          | Inst. n    | Inst. n+1  | Decode  20 |
| Inst. n  | Inst. n+1  | Inst. n+2  | Fetch   |

(a) Pipeline Implementation of Layers

| operation1 | operation2 | operation3 | 21 |

(b) Parallel Operation Instruction Definition

PROGRAMMABLE PRIORITY BRANCH CIRCUIT

CONTENTS

Background of Invention.....
  Related Patent Applications...
  Field of Invention........
  Prior Art............
Summary of Invention.........
Brief Description of Drawings.....
Description of Preferred Embodiment..
Overall Processor Architecture....
  Header Processing Unit.......
    The BBD Instruction Circuit....

BACKGROUND OF INVENTION

Related Patent Applications

Patent application Ser. No. 254,986 by B. D. Mandalia et al, filed at the same time as the present application, discloses a processor that provides structures and instructions dedicated for efficient processing of header and frame information parameters in all levels of todays layered protocols; e.g. parameters characteristic of Open Systems Interconnection (OSI) protocols. Certain aspects of the disclosure of the application apply presently and are incorporated herein by this and subsequent references.

Field of Invention

The field of invention is computer architecture with emphasis to branch processing. Microprocessor technology for real time programming environments is considered an environmental basis for this architecture.

Prior Art

Priority branching methods have been used for interrupt mechanisms. U.S. Pat. No. 4,636,944, 4,315,314 and 4,573,118 disclose such usage, and indicate recognition of the importance of using priority branching to reduce processing time for scanning and polling interrupt requests. However, these do not address key issues of process branching for which the present invention has been devised.

Where the art provides for priority branching only on fixed parameters such as interrupt bits, the present invention provides for branching on variable branch condition or status parameters selectable by program instructions.

Where the art provides for priority branching only in a fixed priority ordering of active parameters, the present invention provides for varied priority ordering which the user can set by programming.

Where the art provides a fixed relation between branch condition parameters and associated target addresses of instructions to be branched to, the present invention provides for user-variable associations between branch condition parameters and addresses of target instructions (also referred to hereafter as branch addresses).

SUMMARY OF INVENTION

The present invention provides a mechanism for executing priority branch on bit detection (BBD) operations, in response to a newly defined BBD instruction. In such operations, a set of status bits representing branch condition parameters is evaluated to ascertain which currently represent active conditions requiring branch program action, and of the latter which should be given priority. The output of this mechanism is a branch address representing the starting instruction of a branch program segment associated with the selected status bit.

Features of the priority selection process and associated circuitry embodied in the present invention are their accessibility to user program variation. Registers determining relative priorities of the status bits are dynamically loadable, under user program control, with different patterns of priority selection codes, and registers presenting the status bits to be evaluated are also loadable under program control. Thus, a single BBD circuit unit may be shared dynamically by multiple sets of status functions. Furthermore, as conditions vary in relation to a given set of status bits currently presented for evaluation, or as different sets of status bits are presented for evaluation, contents of the registers determining priority ordering can be suitably varied.

Another feature hereof is that branch addresses which are selectable as the ultimate output of such BBD circuitry are stored in a stack of registers which are also accessible to dynamic change by user programs. Thus, as conditions associated with a given set of status bits change, or as a new set of status bits is presented for evaluation, a suitable associated set of branch target addresses can be loaded.

A feature of one disclosed embodiment is that the registers for holding branch addresses and priority selection information may be extended in capacity to hold plural sets of respective parameters associatable with plural sets of status bit functions. Thus, the frequency of register loading operations required to adapt to different conditions can be reduced.

Another feature of a presently disclosed embodiment of the invention is that it reduces the normally complex series of operations associated with priority branching to a simple operation executable in a single clock cycle (machine cycle) of the system in which it is used.

Another feature is that registers holding priority determining functions and address information are arranged for access in direct one-to-one correspondence with individual status bits, so that the number of registers needed is considerably less than would be required if the status bits were to be used in combination to address registers in a table lookup mode.

These and other advantages, features and benefits of the invention will be more fully understood as this description progresses.

It is also an aim of this invention to provide for priority branch on bit circuitry to be arranged in a manner to facilitate execution of the complete priority branch operation (including priority selection and address selection action elements) in a single clock cycle of the associated data processing system, whereby such operations when frequently encountered in a processing system can be performed at enhanced throughput rates.

DESCRIPTION OF PREFERRED EMBODIMENT

Overall Processor Architecture

Figure 1:
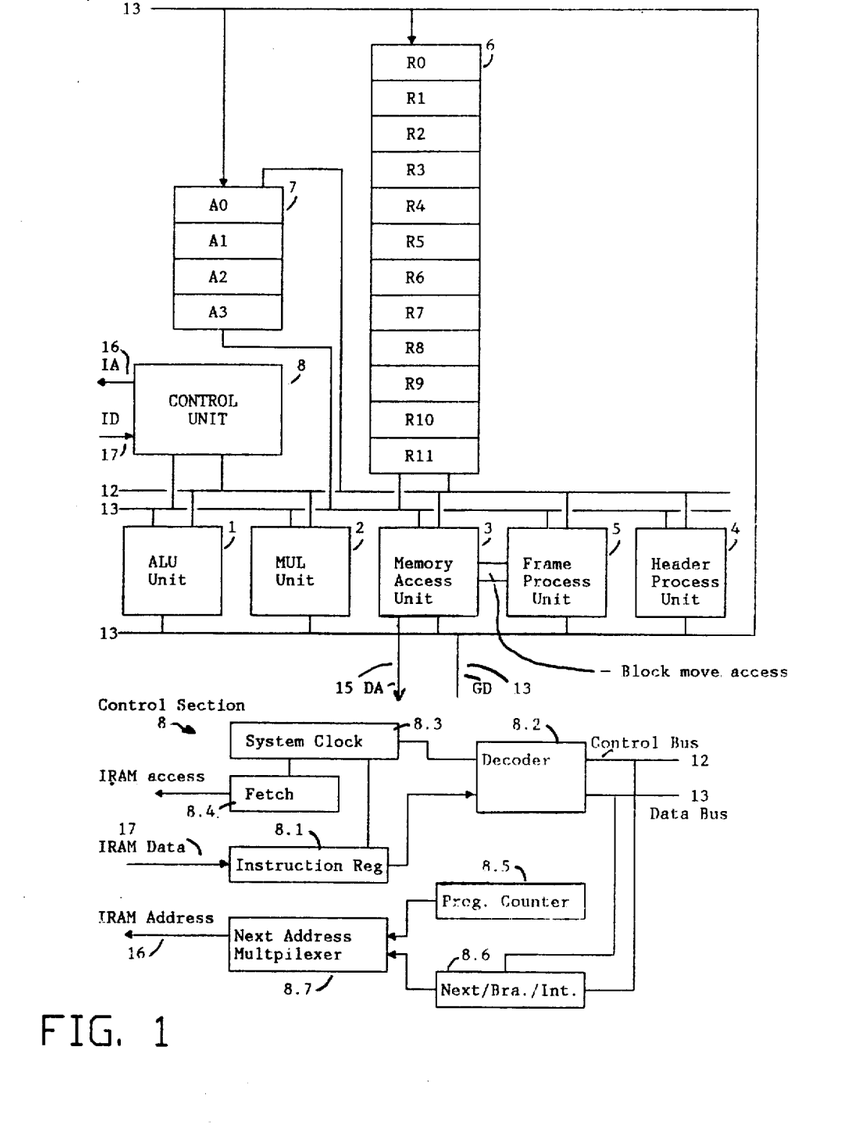
FIG. 1 illustrates a Communications Protocol Processor for layered protocol processing (reference Ser. No. 254,986 above) in which the present invention can be used to advantage.

As environmental background, FIG. 1 shows the overall architecture of a communications protocol processor (CPP) in which the subject invention can be used beneficially. The CPP contains both special purpose circuits geared towards increasing throughput for certain complex and frequently encountered operations, and general purpose circuits including a more or less conventional ALU (arithmetic logic circuit). The special purpose circuits include a branch on bit detect (BBD) circuit constructed in accordance with the present invention.

In respect to general purpose circuits, ALU unit 1 supports basic arithmetic operations (ADD, SUBTRACT, COMPARE), logical operations (OR, AND, XOR), and register transfer operations. Multiplier unit (MUL) 2, operating in coordination with the ALU, supports 16 by 16 multiplication with scaling and rounding functions.

Memory access unit 3, header processing unit 4, and frame processing unit 5 provide special purpose operations. Of particular interest presently is a portion of the header processing unit providing BBD (Branch On Bit Detect) operations.

Other CPP elements include a general purpose data register stack 6, and an address index register stack 7. These comprise portions of internal variably allocatable storage that can be used as input and output for processing units 1–5 using control bus 12 and data bus 13.

Control Unit 8, containing elements 8.1–8.7 shown in the lower portion of FIG. 1, controls and monitors operation execution. Instruction register 8.1 receives instructions from instruction memory (IRAM) shown elsewhere via instruction data bus 17. Instruction operation codes (opcodes) in the instruction register are gated to decoder 8.2 which generates control signals to units 1–5 through control bus 12 and provides immediate data or address information via data bus 13. System clock 8.3 provides timed control signals to the other elements. Fetch controls 8.4 at clocked intervals direct instruction fetching action relative to IRAM. Data bus 13 consists of a multiplicity of bidirectional data paths allowing for parallel transfer of data between register stacks 6 and 7 and process units 1–5. Program counter 8.5 and next branch (or interrupt) control logic 8.6 generate next instruction addresses, one of which is selected by multiplexer 8.7 for application to IRAM via IRAM address bus 16. Data address (DA) bus 15 is used to connect memory access unit 3 to Data Ram (DRAM, also shown elsewhere), for transfer of memory data via bus (GD) 13.

Figure 2:
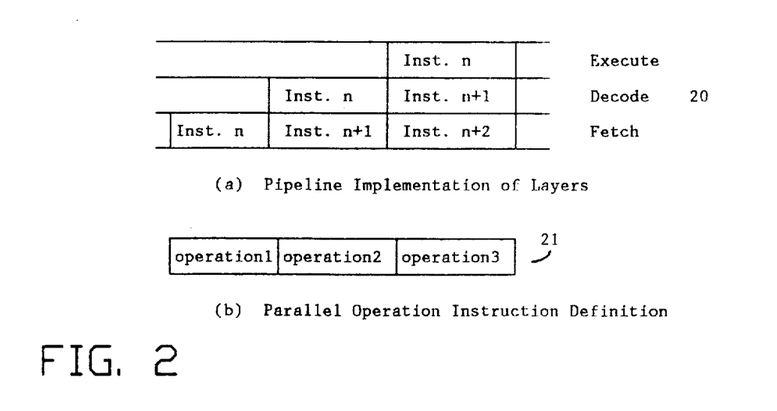
FIG. 2 illustrates a prior art technique for parallelism and pipelining to speed up processing.

Parallel execution of operations designated by instructions is possible using pipelining techniques suggested at 20 and 21 in FIG. 2. While instruction 'n' is being executed next instruction 'n+1' is being decoded and its next instruction 'n+2' is being fetched as shown at 20. In addition, if three operations are called for by one instruction, their decoding and execution may be performed in parallel as suggested at 21. Bus transfer mechanisms and pipelining techniques for such operations are well known and described in "additional references" (1), (3), and (4) above.

Figure 3:
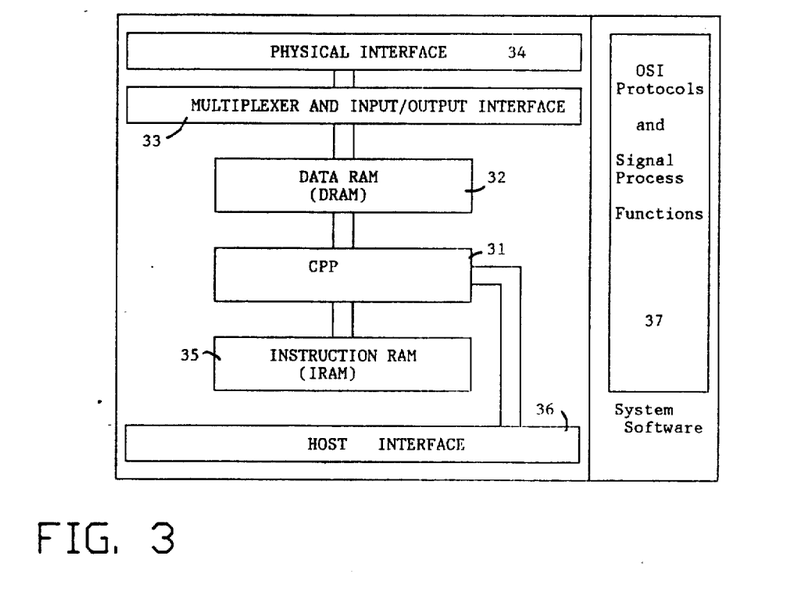
FIG. 3 illustrates the communication environment in which the CPP is expected to operate.

FIG. 3 illustrates a typical application environment for the CPP, the latter shown at 31 in this FIG. Data Ram 32 (also termed DRAM) interfaces with multiplexor and input/output interface 33 to exchange data with physical communication interface 34. Instruction Ram 35 (IRAM) stores instructions of application programs that the CPP supports and allows dynamic execution of functions required at interface 34. Host interface 36 provides a systematic handshake for flow of data and control commands to and from a host processing system. Block 37 represents layered protocol applications and signal processing functions which can be integrally accommodated in this environment.

Header Processing Unit

Figure 4:
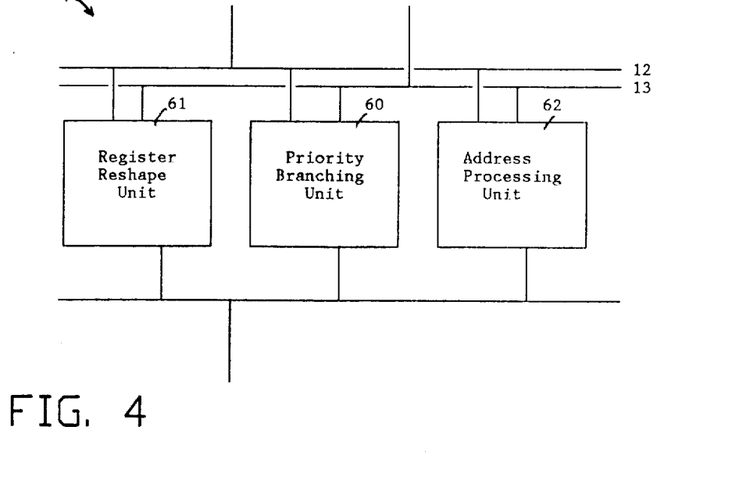
FIG. 4 illustrates a header processing unit of the CPP in which the present invention is used as a component circuit.

FIG. 4 depicts components of header process unit 4 which perform unique operations on packet header parameters in each protocol layer. The subject of the present invention, branch on priority bit detect (BBD) unit 60, performs priority branch on bit detect operations relative to communication status bit parameters contained in headers within each protocol layer. This mechanism performs its operation of priority bit selection and target address retrieval in a single CPP machine cycle, thereby enhancing throughput relative to high speed communication media. However, the same mechanism and its underlying method of operation are considered universally applicable to other processing systems and applications; as should be more fully appreciated from the following description.

Other special purpose units within header process unit 4 include register reshape unit 61, for rearranging registered header data to extract parameters related to the registered data but by known transformations, and address routing unit 62 for translating header address information for message routing purposes. These units and the CPP overall structure are more fully described in the cross-referenced patent application for "Specialized Communications Processor For Layered Protocols", and the remainder of this description will focus primarily on the structure and operation of the subject BBD unit 60.

In response to a special BBD instruction discussed later, BBD unit 60 evaluates multiple status bits and selects a target branch address associated with one of the bits. The bits represent conditions which are either active or inactive and which when active require special action via branch program segments. The bits representing active conditions are evaluated in a predetermined order of priority and the target address selected is one associated with the bit having highest priority.

The BBD Instruction Circuit

Figure 5:
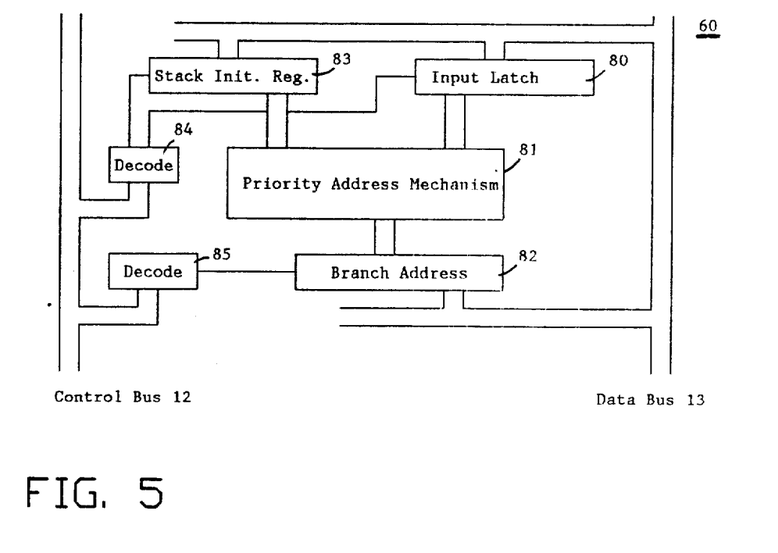
FIG. 5 illustrates the branch on priority bit detect processing unit in the CPP which represents one embodiment of the present invention.

A circuit embodying general characteristics of the unit 60 is shown in FIG. 5. Since it performs its priority branch address selection operation in response to BBD instructions, this circuit is called the BBD Instruction Execution Circuit. Information in input latch 80 is processed for priority bit branching to a destination address using priority address mechanism 81, output of which is transferred to output register 82. Stack initialize register 83 is used to initialize branch address stack elements (shown elsewhere) in priority address mechanism 81. Decoders 84 and 85, responsive to a BBD instruction opcode on control bus 12, generate signals for gating priority branch status bits in input latch 80 to priority address mechanism 81 and also to latch the branch address extracted from the priority address mechanism to branch address register 82. Decoder 84 responsive to a register transfer operation via data bus 13 generates a signal to load stack initialize register 83. Thus, the contents of the branch address stack are alterable by programming to adjust the branch address selections to associate variably to the status bits in latch 80.

Figure 6:
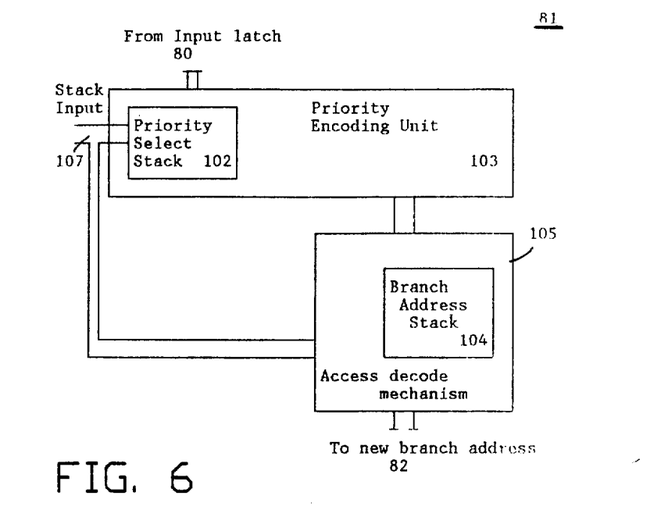
FIG. 6 illustrates a programmable priority address circuit for use in the branch on bit detect unit of FIG. 5.

FIG. 6 is a schematic showing of principal block elements of the priority mechanism 81 of FIG. 5. Such elements include a priority select register stack 102 within a priority encoding unit 103, and a branch address register stack 104 within associated access decode mechanism 105. Both register stacks 102 and 104 are loadable with new information by programmed register loading operations conducted through bus 107.

Acting in response to BBD instructions, unit 103 selects a priority designating code value from one of the registers in stack 102 and applies it as an addressing input to stack 104, whereby a selected branch address is transferred to output register 82. The input latch bits are applied individually to different registers in stack 102, and the bits representing active branch request conditions gate out contents of respective registers in the stack. The operation of unit 103 effectively compares the magnitudes of the values gated out from stack 102, such values effectively denoting the relative priorities of respective input latch bits, and selects as access input to stack 104 the value with highest magnitude. Thus, the branch address selected from stack 104 corresponds to a currently active highest priority bit in latches 80. Since the contents of stack 102 are loadable by programming, it should be understood that the relative priorities accorded to the input latch bits are correspondingly variable.

Furthermore, since the contents of registers 104 are alterable by programming, it will be understood that associations between bits in latches 80 and branch addresses extractable by mechanism 105 are correspondingly variable.

Another feature of the circuit composed of units 103 and 105 is that it can be easily arranged to complete its entire operation of priority determination and branch address extraction in a single "machine" or clocking cycle of the processing system in which it is used. As a result, frequently encountered complex branch on bit detect operations can be rapidly performed and thereby improve system throughput. This is particularly beneficial in processing systems interfacing to high speed communication media, as described in cross-referenced application above for "Specialized Communications Processor for layered protocols".

Figure 7:
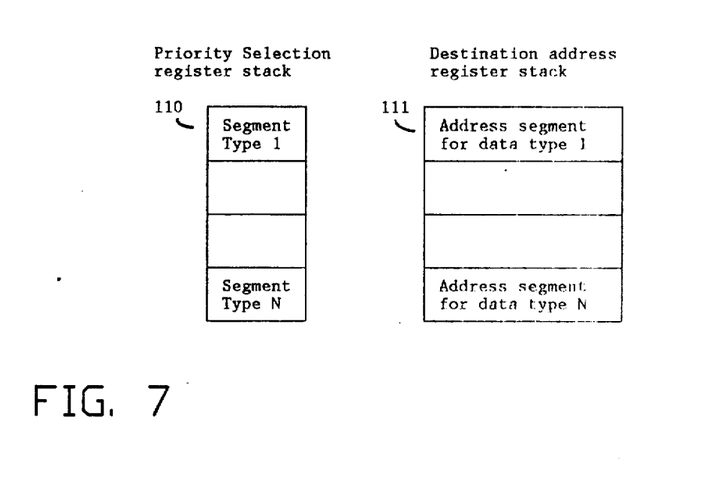
FIG. 7 illustrates use of multi-segment stacks in the subject branch on bit detect unit.

Yet another feature of the mechanism 81, illustrated in FIG. 7, is that the stacks 102 and 104 can be enlarged to segmented stacks 110 and 111, respectively, in order to allow for preloading segments of such stacks simultaneously with priority determination information and/or branch address information associated with multiple sets of conditions or events represented by the bits presented in input latches 80 (FIG. 5). Thus, differently coded BBD instructions designating individual stack segments can be executed repeatedly to evoke actions associated with different sets of branching associations, without having to reload the stacks between repetitions.

Figure 8:
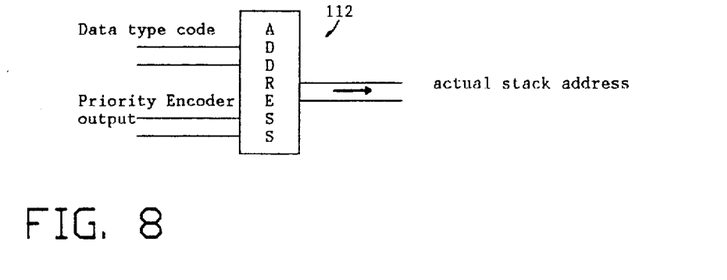
FIG. 8 illustrates address generation for a register stack useful in the subject unit.

FIG. 7 shows how the priority selection stack 110 and branch address stack 111 may be segmented to accommodate multiple sets of different respective data types. FIG. 8 shows logic 112 for accessing such stack segments, wherein the desired segment is selectable by a data type code, and the branch address selection within the selected branch stack segment is made by the output of the priority encoder. For this purpose, the data type code could be provided either as part of the instruction opcode or as part of the operand information accompanying or designated by the opcode. This may be predefined or coded within the instruction set, depending on resources of the instruction set. The width of the data type code (T) is dependent on the number of data type segments desired (N), and defined by $T = \log_2(N)$.

Figure 9:
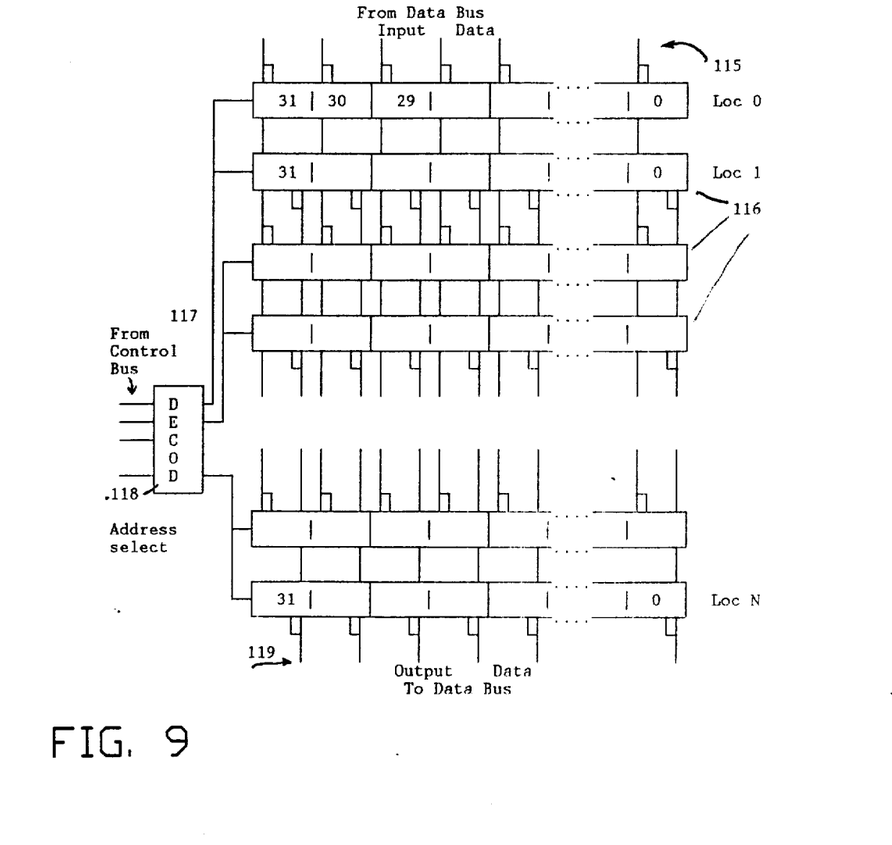
FIG. 9 illustrates a stack useful in the subject unit and its access decode mechanism.

FIG. 9 shows a mechanism to access the various stacks for initialization and direct execution of the BBD instruction. To initialize the branch address stack, decoder 118 processes signals from control bus 12 associated with register loading instructions, to load data from input bus 115 into appropriate registers 116. For read access from this stack, priority encoder 103, responsive to a BBD instruction, supplies a priority encode address to 118 directing, branch address data to data bus 13 via output path 119. In order to support multiple protocols, stack 116 may contain plural sets or segments of branch address registers for relating different branching functions to conditions in input latch 80. As previously noted, this requires definition of different BBD instructions for branch on bit detection to different stack segments/protocols.

Figure 10:
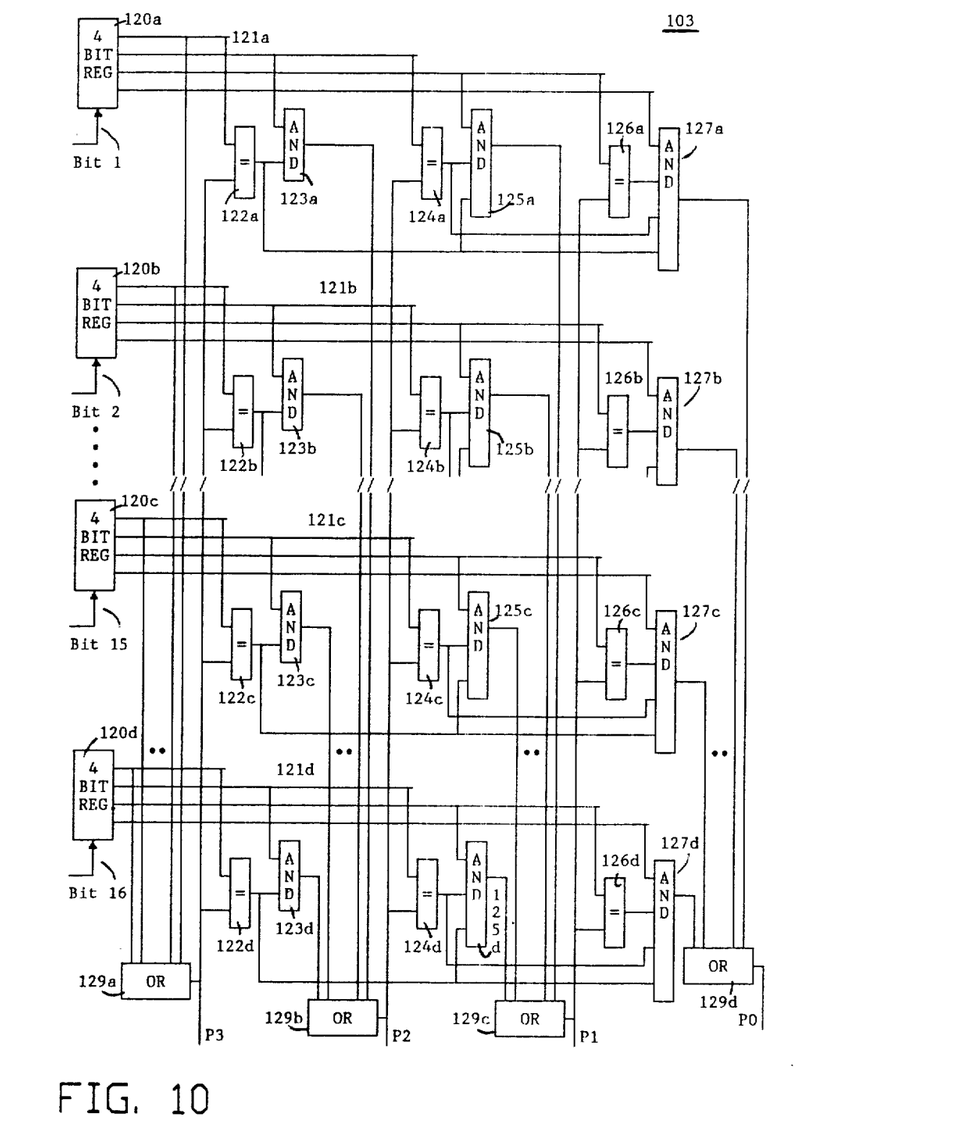
FIG. 10 illustrates a mechanism for identifying and encoding the highest priority input bit using discrete logic.

Implementation of a programmable priority encoder 103 is illustrated in FIG. 10. A plurality of bits from input latch 80 (FIG. 6) labeled bits 1 through 16, serve as selection control inputs for the priority encoder. Each input bit has an associated priority register 120x; where register 120a is associated with input bit 1, 120b with input bit 2, etc. Each priority register 120x may be initialized responsive to one or more register loading instructions of the processor, such as Data Move instructions (Register to Register or Memory to Register-),or Load Immediate instructions. Multiple registers 120x may be initialized in parallel since the processor bus width will typically be wider than the length of a single priority register.

The purpose of initializing priority registers 120x is to set into each a unique priority code to associate under user program control with the condition represented by the respective bit from the input latch 80. Since there are 16 input bits in the example, 4 bits are required to assign each of these inputs a unique binary code number. In general, N bits are required in each priority encoder to handle 2 to the Nth power input bits. Such programmably assigned N bit numbers in registers 120x are evaluated by logic to which the register outputs couple in a manner such that of the numbers associated with input latch bits currently having active or ON states, the number with the largest binary magnitude will be selected for application to the selection input of the branch address stack, and thereby the selected branch will be associated with an input bit programmably designated (by system users or others) as having highest priority.

Once the priority registers 120x, the address register stack (not shown), and the input latch 80 (supplying input bits 1-16), have been loaded, the circuit is ready to execute the priority branch BBD instruction. In doing so, the array of logic gates shown in FIG. 10 will determine which of all the input bits which are "ON" is associated with a priority number with largest relative magnitude. This number is gated to outputs P0, P1, P2, and P3 (P3 being the most significant bit) which are used to address the register stack 116 (FIG. 9) in order to select an associated branch address.

More specifically, operation of the array of gates proceeds as follows. Each active or "ON" input in the set of input bits 1-16 from latches 80 enables the four-bit output 121x of the associated priority register 120x to be transferred to the associated row of gates 122x-127x. Input bits which are inactive or "OFF" will force outputs of associated priority registers to be all zeroes or "OFF". Outputs from priority registers 120x are compared by respective rows of gates, starting with the most significant bit.

OR gate 129a examines the most significant bits of the outputs of all priority registers 120x, and sets its output P3 "ON" if at least one of its inputs is "ON". If all inputs to this OR gate are OFF P3 is set OFF. P3 feeds back to Compare circuits 122x in each row (122a, 122b, 122c...), and causes further transfer of an ON condition through such compare circuits in each row where the most significant bit output from the respective register 120x is equal to the state of P3. Thus, if P3 is ON, then in each row where the highest order output of respective register 120x is ON, respective compare circuit 122x will have its output ON, and in all other rows, the outputs of respective compare circuits 122x will be OFF. On the other hand, if P3 is OFF, then presumably all highest order outputs of 120x are OFF and all compare circuits 122x will have their outputs ON.

ON outputs from compare circuits 122x partially enable respective AND circuits 123x, having as other inputs next most significant bits out of respective registers 120x. Thus, in any rows where respective AND circuits 123x are partially enabled, outputs of such AND circuits will correspond to the states of the respective next most significant bits out of respective registers 120x. Outputs of AND circuits 123x connect to OR circuit 129b which produces output digit P2, which couples back to compare circuits 124x in each row. Outputs of 124x enable respective AND circuits 125x which have as their other inputs third most significant digit outputs of respective registers 120x.

Outputs of AND circuits 125x couple to OR circuit 129c producing third most significant result output digit P1. The latter operates through compare circuits 126x and respective AND circuits 127x to evaluate respective least significant bit outputs of registers 120x. Outputs of 127x couple to OR circuit 129d determining the least significant result output P0.

It may be appreciated that the combination of digits P0-P3 will have a value corresponding to largest magnitude value in the registers 120x, since in any position where the output digit Pj is 1 the next most significant digits in any row will be evaluated further only if the digit from 120x corresponding to the order of Pj is 1. In all other rows all lesser significant digits will have no further effect on the less significant digits Pi ($i<j$). Since no two registers 120x will be set with the same combination of bits, it follows that one and only one register output will determine the ultimate value of all four digits P0-P3, and that register output will be the one with the highest numerical value.

As mentioned previously, outputs P0-P3 are used to address the branch address stack with an encoded address representing the priority number associated with a highest priority active input latch bit. This results in a one to one positional correspondence between addresses in the address stack and priority levels programmed into registers 120x. Alternately, outputs of circuits in FIG. 10 may be used to develop signals positionally associated with input bits 1-16 for direct application to individual registers in the branch address stack, and such outputs when active would directly gate contents of the respective branch address registers to the stack output.

This arrangement would require addition to the row logic circuits of FIG. 10 of not-shown compare circuits 128x (positioned to the right of respective And circuits 127x) for comparing least significant bits in respective registers 120x with P0, and And circuits 129x responsive to outputs of all respective compare circuits 122x, 124x, 126x and 128x for producing respective control signals for direct application to respective register output gates in the branch stack.

Note also that the lowest priority bit, with associated number=0, results in the same branch as if no bits are set. Thus, as shown, only 15 unique branch bit conditions can be set. Simple logic can be added if needed to check for all zeros from input bits 1-16, and gate to the branch address stack an associated different register select signal function on occurrence of that condition; if 16 unique branch address selection functions are needed. A 16 bit NOR gate, providing an active output if all input bits are zero, could be used to degate the register corresponding to the lowest priority, even if P0-P3 indicate it should be selected, and further used to select output of a not-shown 17th register within the Branch Address Register Stack.

We claim:

1. In a data processing system, priority branch on bit apparatus for efficiently executing program branch instructions in a single system cycle to select subroutines for performing selected functions associated with a set of user parameters comprising input register means storing a set of status bits, each bit corresponding to a respective one of said parameters;

program controlled means setting each status bit to an active state when its respective parameter requires subroutine execution;

priority register means coupled to said input register means and storing a set of priority codes, each code assigned to a respective one of said parameters and its status bit;

address register means storing a set of branch addresses each pointing to a respective one of said subroutine associated with a respective one of said parameters and its status bit;

logic means, including a priority encoding unit coupled to said priority register means and to said address register means, and responsive to the execution of a predetermined one of said branch instructions for transferring priority codes corresponding to active status bits in said input register means from the priority register means to the priority encoding unite to produce output signals representative of the active status bit having the highest priority code; and means responsive to said output signals for selecting a branch address in said address register means corresponding to the last-mentioned active status bit.

2. In a data processing system, priority branch on bit apparatus for executing program branch instructions in a single system cycle to select subroutines for performing selected functions associated with a set of user parameters comprising     input register means storing a set of status bits, each bit corresponding to a respective one of said parameters;

first program controlled means setting each said status bit to an active state when its respective parameter requires subroutine execution;

priority register means coupled to said input register means and storing a set of priority codes, each code assigned to a respective one of said parameters and its status bit;

address register means storing a set of branch addresses each pointing to a respective one of said subroutines associated with a respective one of said parameters and its status bit; and     logic means, including a priority encoding unit coupled to said priority register means and to said address register means, and responsive to the execution of a predetermined one of said branch instructions for transferring priority codes corresponding to active status bits in said input register means from the priority register means to the priority encoding unit for selecting the branch address in said address register means pointing to the subroutine associated with the active status bit having the highest assigned priority code.

3. The data processing system of claim 2 wherein a plurality of sets of subroutines are provided, each set of subroutines being provided for performing function associated with a respective set of user parameters, said system further comprising     second program controlled means preconditioning said priority register means with a set of priority codes assigned to a predetermined one of said user parameter sets,     third program controlled means preconditioning said address register means with a set of branch addresses pointing to a respective set of subroutines associated with said predetermined one user parameter set,     said first program controlled means effective while said register means are so preconditioned for setting the status bits in said input register, corresponding to parameters in said one predetermined set requiring subroutine execution, to their active states, and     said logic means responsive to a predetermined branch instruction for selecting a branch address in said address register means pointing to the subroutine associated with the active status bit in the input register with the highest priority.

4. The data processing system of claim 3 further comprising:

a plurality of sets of first registers in said priority register means,     said second program controlled means preconditioning each set of first registers with a set of priority codes assigned to a respective different one of said user parameter sets,     a plurality of sets of second registers in said address register means,     said third program controlled means preconditioning each set of second registers with a set of branch addresses pointing to a respective set of subroutines associated with a respective different one of said user parameter sets,     said logic means further including means responsive to different ones of said program branch instructions; designating respective different first and second register sets, for transferring priority codes corresponding to active status bits in said input register means form respective first register sets to the priority encoding unit for selecting branch addresses from respective second register sets in accordance with the active status bit with the highest priority, and     program controlled means conditioning the input register means for use with different sets of suer parameters, whereby the priority branch apparatus may operate continuously with different sets of parameters without reloading of the first and second register sets.

5. The data processing system of claim 2 further comprising program controlled means for preconditioning said priority register means to vary the priority codes assigned to each of the respective parameters.

6. The data processing system of claim 2, wherein more than one subroutine may be associated with each of at least certain of said parameters, further comprising program controlled means for selectively preconditioning said address register means to vary the branch addresses associated with said certain parameters.

7. The data processing system of claim 6, wherein more than one subroutine may be associated with each of at least certain of said parameters, further comprising program controlled means for selectively preconditioning said address register means to vary the branch addresses associated with said parameters.

8. In a data processing system, a method of performing priority branch on bit operations in a single system cycle to select subroutines for performing functions associated with a set of user parameters comprising:

storing a set of status bits, each bit corresponding to a respective one of said parameters;

storing a set of priority code values, each code being assigned to a respective one of said parameters and its status bit;

storing a set of branch addresses, each pointing to a respective one of said subroutines associated with a respective one of said parameters and its status bit;

setting each said status bit to an active state when its respective parameter requires subroutine execution; and     in response to a predetermined instruction of said system;

comparing the priority code values associated with the status bits which are set to their active states,     determining the highest one of said compared priority code values, and selecting a branch address to the subroutine associated with the active status bit having said highest compared priority code value.

9. In a data processing system wherein a plurality of sets of subroutines are provided for performing functions associated with respective sets of user parameters, a method of performing priority branch on bit operations in a single system cycle of operation to select certain of said subroutines when their respective parameters require action without having to reload branch data associated with the parameters comprising:

storing a respective set of status bits for each set of parameters, each bit in a set corresponding to a respective one of said parameters in its respective set;

setting each status bit to an active state when its respective parameter requires subroutine execution;

storing a respective set of priority values for each set of parameters and its respective set of status bits, each priority value in a set being assigned to a respective one of the parameters in its respective set and to its corresponding status bit;

storing a respective set of branch addresses for each set of parameters and its respective set of status bits, each branch address in a set pointing to a subroutine associated with a receptive one of said parameters in a respective parameter set and to its corresponding status bit;

assigning each set of parameters to a different one of a plurality of differing priority branch on bit instructions of the system; and in response to the execution of each one of said differing instructions, selecting a set of status bits, priority values and branch addresses corresponding to the parameter set assigned to the instruction being executed, comparing the selected priority code values which are set to their active states, determining the highest one of said compared priority code values, and selecting the branch address to the subroutine associated with the active status bit having said highest compared priority code value.

* * * * *